METHOD OF AND APPARATUS FOR ELECTRONIC COLOR CORRECTION

Filed Feb. 11, 1959 7 Sheets-Sheet 1

Inventor:
Rudolf Hell.
By [signature] Atty.

METHOD OF AND APPARATUS FOR ELECTRONIC COLOR CORRECTION

Filed Feb. 11, 1959 7 Sheets-Sheet 2

Inventor:
Rudolf Hell.
By [signature] Atty.

Inventor:
Rudolf Hell.
By [signature] Atty.

July 18, 1961 R. HELL 2,993,087

METHOD OF AND APPARATUS FOR ELECTRONIC COLOR CORRECTION

Filed Feb. 11, 1959 7 Sheets-Sheet 4

Inventor:
Rudolf Hell.
By [signature] Atty.

July 18, 1961 R. HELL 2,993,087

METHOD OF AND APPARATUS FOR ELECTRONIC COLOR CORRECTION

Filed Feb. 11, 1959 7 Sheets-Sheet 5

Inventor:
Rudolf Hell.
By [signature] Atty.

July 18, 1961 R. HELL 2,993,087

METHOD OF AND APPARATUS FOR ELECTRONIC COLOR CORRECTION

Filed Feb. 11, 1959 7 Sheets-Sheet 6

Inventor.
Rudolf Hell.
By. [signature] Atty.

Inventor:
Rudolf Hell.
By [signature] Atty.

United States Patent Office 2,993,087
Patented July 18, 1961

2,993,087

METHOD OF AND APPARATUS FOR ELECTRONIC COLOR CORRECTION

Rudolf Hell, Kiel, Germany, assignor to Dr.-Ing. Rudolf Hell Kommanditgesellschaft, Kiel-Dietrichsdorf, Germany, a German company Filed Feb. 11, 1959, Ser. No. 792,666
Claims priority, application Germany Feb. 11, 1958
13 Claims. (Cl. 178—5.2)

The present invention is concerned with a method of and apparatus for electronic color correction in the reproduction of color copies.

In the reproduction art, three or core color extractions of a copy to be reproduced are made for multi-color reproductions. These color extractions may be in different forms, for example, in the form of photographic plates ("color extractions" in the narrow sense of the reproduction technique) taken from the copy to be reproduced by the use of predetermined color filters, in which case corresponding photographic opacities (blackening) or transparencies belong to each picture or copy point (in three color extractions); or in the form of three photocell currents produced in synchronous pointwise and linewise scanning of such photographic extractions by means of moving light spots and respectively associated photocells; or, finally, in the form of three photocell currents obtained in pointwise and linewise scanning of the color original (copy to be reproduced) by means of a moving light spot and three photocells, whereby the light reflected from or passed through the picture (copy) point is by means of a prism spectrally separated into three basic colors or into three beam paths in which are interposed color filters.

The term "uncorrected color extractions," used in the following explanations, is intended to mean the trio of three-color measuring values, each belonging to a picture point of the original (copy to be reproduced). The color measuring values are obtained by optical evaluation of the copy to be reproduced, by means of a light exposure element of predetermined spectral sensitivity distribution (for example, a photographic plate, photocell and the like), with the use of three color filters of predetermined spectral permeability and illumination with a light source of predetermined spectral energy distribution. The evaluation may be effected simultaneously for the entire copy to be reproduced (for example, a photograph) or for the individual picture points of the copy in succession as to time (for example, picture scanning with moving light spot and photocell).

It is known that these originally so called "uncorrected color extractions" must be corrected before they are used for the etching of three or more color extraction printing forms, which in turn are, after coloring with correspondingly different printing colors, employed to obtain the color reproduction by aligned printing thereof upon a desired medium such, for example, as paper.

The color correction is necessary because, in the production of uncorrected color extractions—by photographic methods or by electro-optical scanning by means of photocells, etc.—color measurement values are always obtained which are determined by the light sources and the filters employed and by the spectral sensitivity of the exposure devices, and on the other hand, because the contents of the so called "corrected color extractions" do not consist of color measurement values but of color or pigment dosings which depend largely upon the colors used for reproduction as well as upon the paper used for printing and also upon the printing method. Accordingly, different matters and concepts are brought into mutual relationship.

The coloring matter dosings may be present in diverse form, for example, in relief printing and in offset printing as "relative screen point values" or in intaglio printing as relative depths of cups or as "opacities" or "transparencies" of three photographic plates ("corrected color extractions" in narrow sense of the reproduction technique), by means of which the printing forms for the relief printing, the offset printing and the intaglio printing are etched; or as "relative absorptions" of the prints produced upon standard printing paper by means of reproduction printing forms using black printing color; or as electrical voltages controlling three light sources which are variable as to brightness, by means of which three photographic plates are as corrected color extractions illuminated pointwise and linewise, as is known in picture telegraphy; or, finally, as electrical voltages for controlling the drive systems of three engraving tools by means of which three color extraction printing forms are electromechanically directly engraved.

The expression "corrected color extractions" used in the following explanations is intended to mean the trio of the three dosings of coloring matter, each dosing belonging to the picture point of the reproduction which corresponds to a similar picture point of the copy to be reproduced.

Whether the relationships between the coloring matter dosings and the color measurement values are ascertained empirically or theoretically, the coloring matter dosings $u$, $v$, $w$ are in each case predetermined characteristic, definite and continuous or steady functions of the coloring measurement values $x, y, z$:

$$u=b(x, y, z) \text{ (Blue)}$$
$$v=r(x, y, z) \text{ (Red)}$$
$$w=g(x, y, z) \text{ (Yellow)}$$

wherein the functions $b$, $r$, $g$ depend upon the choice of the color measuring values $x$, $y$, $z$, the coloring matter dosings $u$, $v$, $w$, the coloring matter for the reproduction, and also upon the printing paper and the printing method.

In the socalled "color samplers," the conversion or recalculation of the color measuring values into the coloring matter dosings, that is, the color correction, is effected automatically and electronically with high speed. Such a color correction machine, which consists essentially of three electronic calculating machines, has three inputs and three outputs. To the three inputs are conducted voltages $Ux$, $Uy$, $Uz$ which are proportional to the color measurement values $x$, $y$, $z$, and at the three outputs are obtained electrical voltages $Uu$, $Uv$, $Uw$ which are proportional to the coloring matter dosings $u$, $v$, $w$. The speed at which the function values are taken off corresponds in general to the speed at which the variables are supplied, such speed corresponding to the speed of scanning of the picture or copy points.

Several devices are known for electrically or electronically representing a steady function of three variables, all such devices being very complicated and involved, and it is, therefore, desirable to replace these devices by a simpler and economically more advantageous device. While the expenditure in the electrical representation of steady functions of two variables is within tolerable limits, difficulties of a fundamental nature appear at the transition from two to three variables, with retention of the steadiness of the functions, which can in known manner be overcome only with great expenditure.

The invention lessens these difficulties by the use of a method in accordance with which, first, the three steadily variable color measurement values $x$, $y$, $z$ of the color picture points of the copy to be reproduced are respectively substituted by a sufficient number of different discrete values; second, in which the three constantly variable coloring matter dosings $u$, $v$, $w$ (for example, the relative screen point sizes or depth of cutouts) for the color picture points of the reproduction, which are correlated with the color measurement values $x$, $y$, $z$ by three empirically or theoretically ascertained functions $u=b\ (x, y, z)$, $v=r\ (x, y, z)$, $w=g\ (x, y, z)$, are likewise substituted by a sufficiently great number of discrete values; third, in which the color measurement values represented by proportional electrical signals are continuously fed to an electronic storage device in accordance with the scanning speed; and fourth, in which the coloring matter dosings represented by proportional electrical signals are continuously taken from an electronic storage device in time intervals which are equal to or shorter than the time required for the scanning of a picture point.

Experiments have shown that it is in the color correction operation unnecessary to consider all steadily variable color measuring values $x, y, z$ and all steadily variable coloring matter dosings $u, v, w$, but that it is sufficient to consider only the finite number of discrete values thereof, the number lying in the order of magnitude of about 50, and which are selected in suitable and not necessarily identical intervals. It has also been found that the multiplicity of the function values $u, v, w$ is of the same order of magnitude as the multiplicity of the values of the variables $x, y, z$. The meaning of this will be appreciated upon considering the following:

It shall be assumed that each of the variables $x, y, z$ can assume $h$ different values. There will then be exactly $h^3$ different trios of variables $(x, y, z)$ to which can be allotted for each function $b, r, g$ at the most $h^3$ different function values $u, v, w$. However, if each function $b, r, g$ can respectively assume only $h$ different function values, and assuming further that each function value $u, v, w$ occurs on the average with the same frequency, it follows that on the average $h^3:h=h^2$ different trios of variables $(x, y, z)$ will lead for each of these functions to the same function value $u, v, w$.

In accordance with a feature of the invention, the discrete color measuring values $x, y, z$ are prior to the correction subjected to a logarithmic compression and the discrete color dosing values $u, v, w$ are after correction subjected to anti-logarithmic expansion. It shall be considered in this connection that, if the color measuring values $x, y, z$ are in particular correction problems relatively far apart, it will be advantageous to crowd these values together by substituting therefor their logarithms. The color dosing values thus resulting accordingly appear likewise crowded together and must subsequently be expanded.

In accordance with another feature of the invention, the electronic storage devices for the stored value amounts of the three color correction functions $b, r, g$ are for carrying out the different color correction requirements altered by means of an exchangeable wiring associated therewith.

According to a further feature of the invention, the new method is carried out by a device comprising for each color measuring value $x, y, z$, an electronic channel to the input of which is continuously conducted the color measuring value which is variable as to time and represented by proportional electrical signals, such value being continuously fed to the input in accordance with the scanning speed, such channel comprising respectively a switch for brief periodic reading of the signals, a quantisizing device for the conversion of the discrete signals obtained in the reading into a finite number of signal quanta, and a converter for the indication of the individual quantum numbers, such converter having a number of outputs which is equal to the number of stages in the quantisizing operation, a potential variation appearing in each reading period only at the outlet to which is allotted the signal quantum which occurs incident to the reading.

In accordance with another feature of the invention, means are provided in each electronic channel for the color measuring values $x, y, z$ for representing the signal quanta either by impulse number corresponding thereto or in coded manner.

In accordance with another feature of the invention, the new method is carried out by the use of a further device comprising a three-dimensional matrix provided with coincidence switches having respectively three inputs and one output, the inputs being respectively connected with the outputs of the $x$-, $y$- and $z$-channels, each coincidence switch switching through to its output the output voltages which are present from the three channels in a reading period, then and only then when all three are simultaneously present.

Another feature of the invention contemplates the provision of a further device providing for each of the discrete color dosing values $u, v, w$ a switch and a voltage source, the voltage of which is proportional to the respective color dosing value, each coincidence switch of the matrix being connected on the output side with the three inputs of a switch group consisting respectively of a $u$-, a $v$- and a $w$-switch in accordance with the functional allocation, means for connecting all $u$-, all $v$- and all $w$-switches on the output side mutually to a common output line, and control means which are effective for causing those of the three $u$-, $v$- and $w$-switches forming a group, which are in a reading period closed by an impulse given off at the output of a coincidence switch, to release the three respectively associated color dosing voltages $u, v, w$ for an interval to the common output lines, until all $u$-, $v$- and $w$-switches are again opened by the control impulse.

Still another feature of the invention resides in a further device providing a timing generator and an impulse generator for the timing, synchronizing and control of the individual switching operations in the electronic equipment, the impulse frequency of the impulse generator exceeding the timing frequency delivered by the timing generator by an amount which is as many times higher as the highest possible quanta stage number or basic number of the code employed, increased by the number of control impulses required in each reading period for switching purposes, also providing a counter for periodically counting the impulses delivered by the impulse generator during a reading period, and further providing a converter for supplying at the output side, always in the form of one impulse, partial counting results required for the control of switching operations.

The various features and objects of the invention will appear from the description of examples which will be rendered below with reference to the accompanying drawings. In the drawings, FIG. 1 represents the fundamental operation of the apparatus;

FIG. 2 shows a wiring device for changing the functional relationships;

FIGS. 3 and 4 indicate the entire apparatus in block diagram manner;

FIGS. 5*a* to 5*e* show the timing plan of the apparatus;

FIG. 6 illustrates in block diagram manner the quantisizing and the coding;

FIGS. 7*a* to 7*h* represent the timing plan for the coding device;

Figure 1:
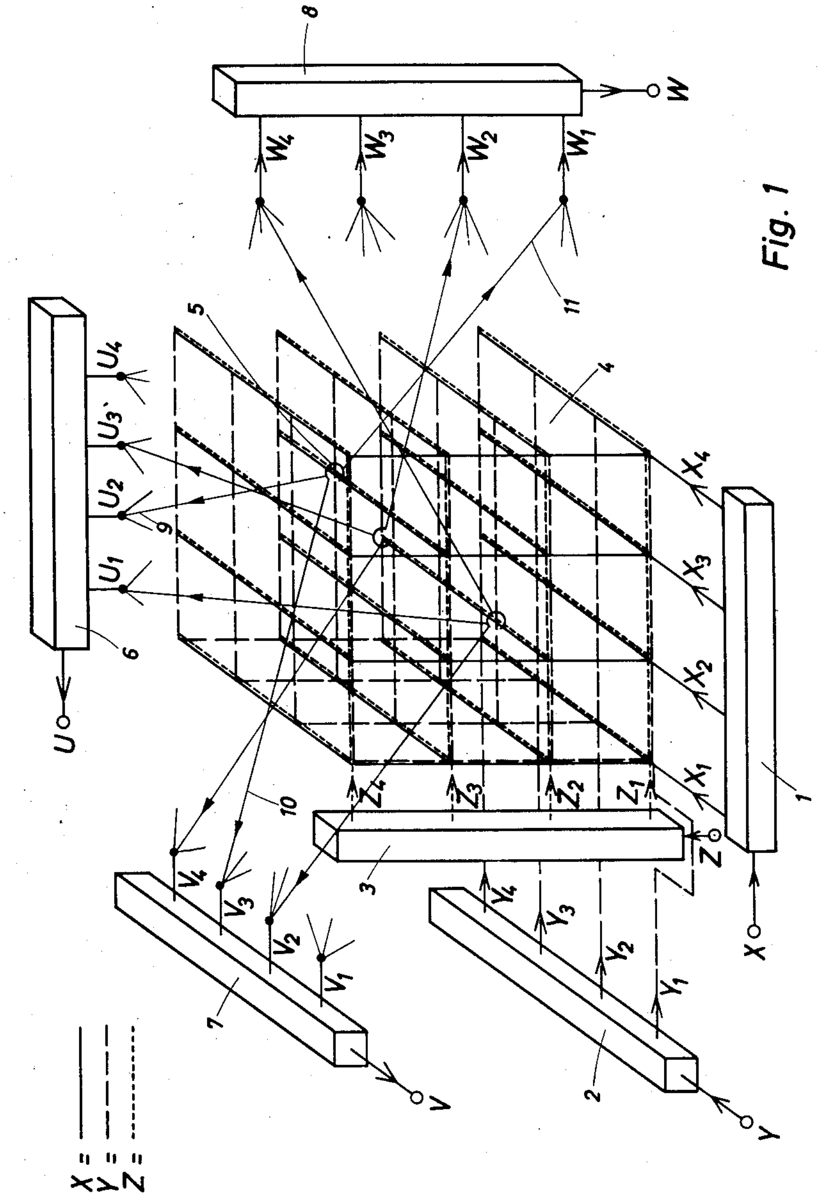

FIG. 1 shows in schematic manner the basic operation of the electronic calculating apparatus. In order to avoid obscuring the clarity of the representation, it is assumed that the color measurement values $x, y, z$ are quantisized in only four stages. The steadily changing variable values $x, y, z$ are accordingly substituted respectively by four discrete value $x_1 \ldots x_4$; $y_1 \ldots y_4$; $z_1 \ldots z_4$, each succeeding value being greater than the respectively preceding value; however, the successive values need not have a constant difference.

The multiplicity of allotted function values (coloring matter dosings) $u, v, w$ corresponds in the illustrated example to that of the values of the variables $x, y, x$. The steadily changing function values $u, v, w$ are accordingly likewise substituted each by four discrete values $$u_1 \ldots u_4; v_1 \ldots v_4; w_1 \ldots w_4$$

The number of function values of each of the functions $u, v, w$ may be greater or smaller than the number of the values of the variables of each variable $x, y, z$, however, in the case of the illustrated example not exceeding at the most $4^3=64$.

Numerals 1, 2, 3 indicate electronic devices to which are continuously conducted the steadily changing measuring values $x, y, z$, at a speed which corresponds to the speed at which these variables are being scanned. The steadily changing variable values $x, y, z$ are in these devices first periodically briefly read and the momentary values obtained in such reading are thereupon quantisized, that is, they are substituted by respectively nearest whole-number fixed values $x_i, y_i, z_i$; $i=1 \ldots 4$. To each quantum of variables $x_i, y_i, z_i$ is allotted an outlet which gives off an impulse or assumes a changed potential then and only then when the respectively associated quantum of variables is during the reading ascertained.

Numeral 4 indicates a spatial matrix of electronic coincidence switches, in the illustrated example $4^3=64$ electronic coincidence switches 5, the structure of which will be presently explained. The expression "spatial matrix" is not to be taken in the literal sense; the matrix elements in the form of the coincidence switches 5 may also be arranged in a single plane. At each crossing point with the coordinates $x, y, z$ is disposed a coincidence switch 5. The coincidence switches are arranged in discrete parallel planes $x=x_i$, $y=y_i$, $z=z_i$, $i=1 \ldots 4$, and form in each of these planes a rectangular network. The three plane arrangements intersect perpendicularly and form a three-fold orthogonal system. In each of the planes $x=x_i$, $y=y_i$, $z=z_i$, there is a line which extends to all of the switches 5 disposed in the corresponding plane. The starts of all these $3.4=12$ lines are connected to the outputs or outlets $x_1 \ldots x_4$; $y_1 \ldots y_4$; $z_1 \ldots z_4$ of the switching devices 1, 2, 3. Accordingly, three lines extending from the outputs $x, y, z$ of the devices 1, 2, 3, pass through each matrix point 5 with the coordinates $x, y, z$.

In FIG. 1, the $x$-lines are shown full, the $y$-lines by long dashes, and the $z$-lines by short dashes.

The matrix switches constitute And-switches, that is, they deliver a voltage or assume changed potential then and only then when they are simultaneously put under voltage from all three coordinate lines or when these three coordinate lines assume a changed potential simultaneously.

Numerals 6, 7, 8 indicate three further electronic devices adapted to effect operations which are the reverse of the operations effected by the devices 1, 2, 3. From the outlets $u, v, w$ are taken the discrete function values—the coloring matter dosings—$u_1 \ldots u_4$; $v_1 \ldots v_4$; $w_1 \ldots w_4$ from local voltage sources. From each matrix switch 5 extend three lines 9, 10, 11, the first line 9 extending to one of the inputs $u_1 \ldots u_4$, the second line 10 extending to one of the inputs $v_1 \ldots v_4$ and a third line 11 extending to one of the inputs $w_1 \ldots w_4$. When the And-condition is satisfied in one of the matrix switches, that is, when the corresponding switch gives off voltage or assumes a changed potential, the function values allotted to the devices 6, 7, 8 are in such devices simultaneously released and such values are taken off at the outputs or outlets $u, v, w$.

Two different matrix switches, that is, two different variable trios $(x, y, z)$ need not necessarily have to extend to different function value trios $(u, v, w)$. Nor does each matrix point have to be equipped with a coincidence switch; those of the matrix points may be left free which belong to trios of variables that are not needed. The three lines 9, 10, 11 extending from the matrix switches 5 to the inlets of the devices 6, 7, 8 are mutually uncoupled by means of rectifiers (not shown).

Figure 2:
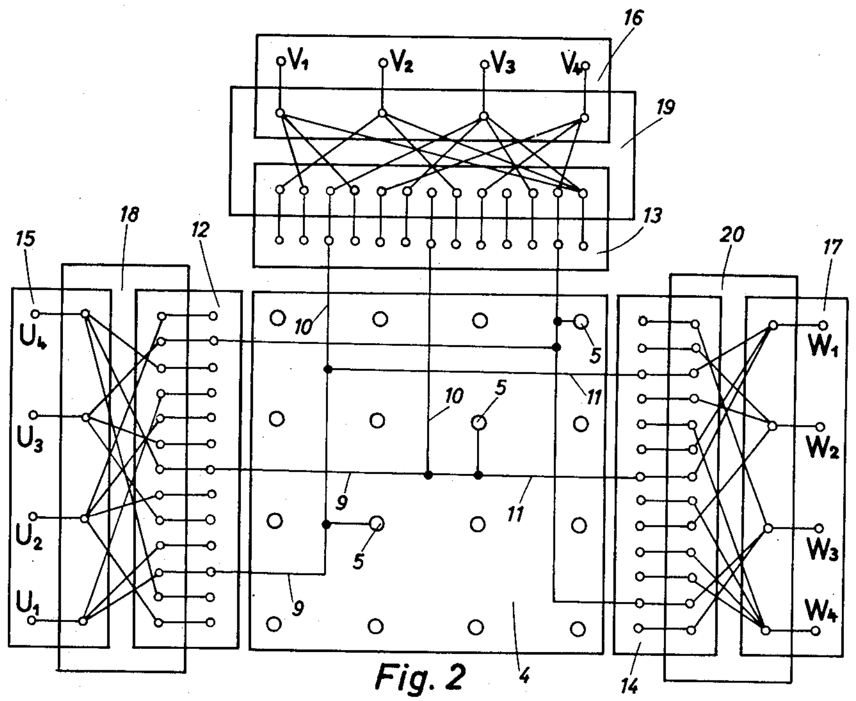

The manner in which the matrix switches 5 are allotted to the inputs $u, v, w$, defines the three functions $b, r, g$. The functions $b, r, g$ can be changed by changing the allotment, that is, by changing the wiring. This is important when it becomes necessary, due to changes in the reproduction printing colors, the printing paper or the printing method, to change over to other functions $b, r, g$ which express the changed functional relationship between the coloring matter dosings and the color measuring values. FIG. 2 shows an example of a wiring change device.

Referring now to FIG. 2 the switch matrix 4 is for the sake of clarity shown as a plane matrix and a few matrix switches 5 are schematically indicated therein. From each matrix switch 5 extend three lines 9, 10, 11 which are in some but invariable sequence connected with terminals of three terminal strips 12, 13, 14. Next to these terminal strips are disposed terminal strips 15, 16, 17 containing the input terminals $u_1 \ldots u_4$; $v_1 \ldots v_4$; $w_1 \ldots w_4$ of the devices 6, 7, 8 discussed in connection with FIG. 1.

Numerals 18, 19, 20 indicate three exchangeable terminal strips which can be respectively plugged to the terminal strips 12 and 15, 13 and 16, 14 and 17. The terminal strips 18, 19, 20 contain different fixed wiring for effecting the different allotting of the values of the variables $x, y, z$ to the function values $u, v, w$. A supply of such exchangeable terminal strips will make is possible to satisfy in simple manner the different correction requirements that may result from a change of printing colors, printing paper or the printing method.

Figures 3, 4:
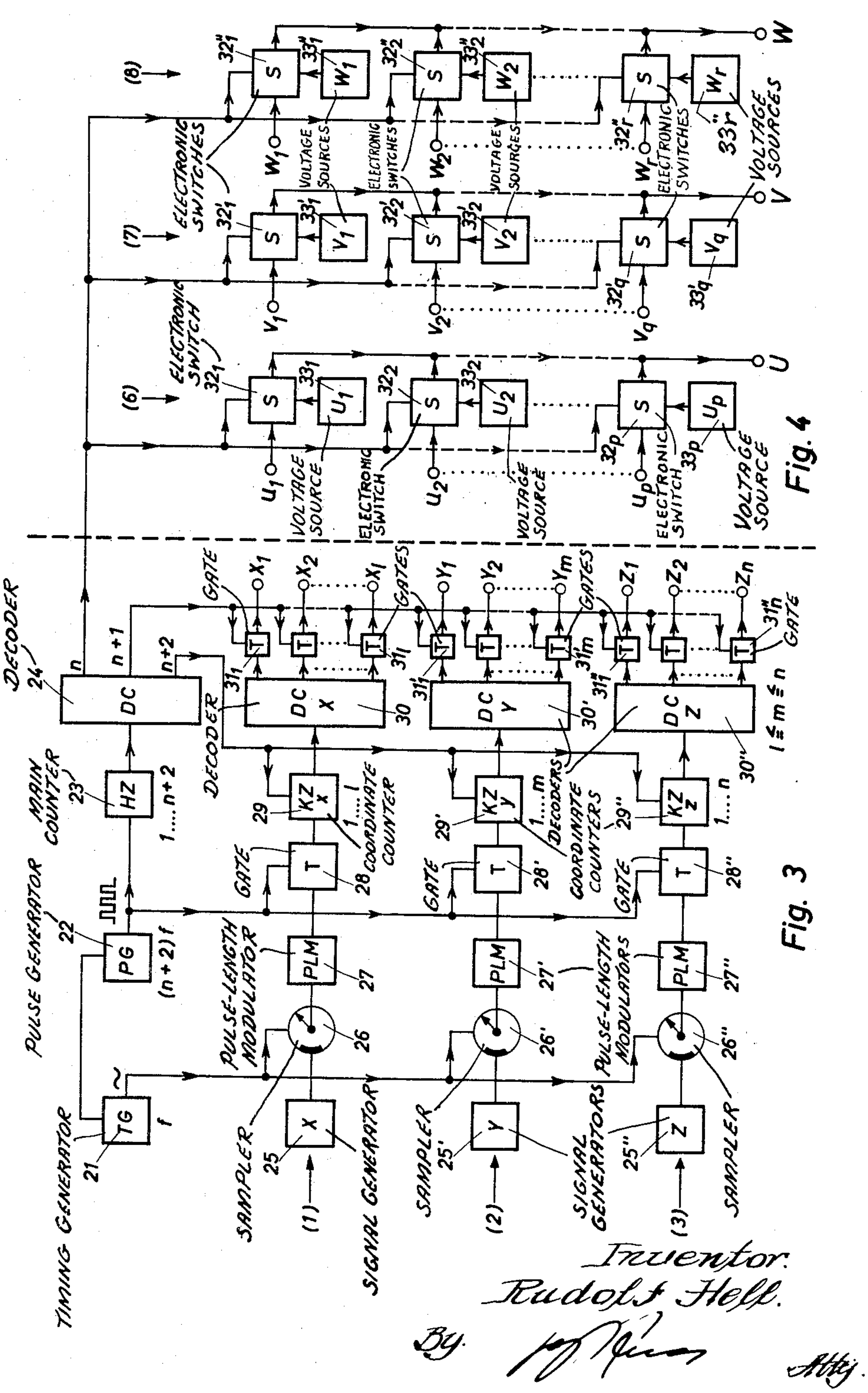

FIG. 3 shows in block diagram manner an example for the devices 1, 2, 3 explained in connection with FIG. 1.

It shall be assumed that the values $x, y, z$ of the corresponding variables are respectively quantisized in $l$ stages $x_1 \ldots x_l$, in $m$ stages $y_1 \ldots y_m$ and in $n$ stages $z_1 \ldots z_n$, and that $l \leqq m \leqq n$. Accordingly, if $l \neq m \neq n$, $n$ will be the highest possible number of stages. It shall also be assumed for the sake of simplicity that $n+2=2^k$ is a power of 2, which however is not absolutely required.

In FIG. 3, numeral 21 indicates a timing generator (TG) which supplies an alternating voltage with the frequency $f$ and the period $T=1/f$. Numeral 22 indicates an impulse generator (PG) which supplies approximately rectangular impulses at a frequency $(n+2)f$ with a period $\tau=1/(n+2)f$. The two generators 21 and 22 are mutually synchronized and the phase position of their frequencies is such that an impulse peak from 22 coincides with a maximum from 21. Numeral 23 indicates an electronic counter which may be termed the main counter (HZ). This counter may, for example, be a binary counter consisting of $k={}^2\log(n+2)$ serially connected flip-flop circuits. However, it may also be represented by serially connected current gates (thyratrons) or by counting tubes. The main counter 23 counts continuously and periodically the impulses delivered from 22 up to the $(n+2)$ impulse. At the $(n+3)$ impulse which corresponds to the first impulse of the next reading period T, it begins to count anew. Two more counting steps are required over and above the highest quantum number $n$, which will be presently explained more in detail. Numeral 24 indicates an electronic decoder (DC)—in the present case especially a binary-ternary-converter—which is provided with three output terminals at which will successively appear an impulse or a potential change, then and only then, when the $n$th, $(n+1)$th, $(n+2)$th impulse is being counted. This converter serves respectively for the reading and the indication of the counting results which are, however, limited to only three numbers. The signalling terminals for the remaining counting steps $1, \ldots, n-1$ are not required and therefore have been omitted.

Numerals 25, 25′, 25″ indicate three signal generators which supply the three steadily variable color measuring values *x, y, z*. Numerals 26, 26′, 26″ indicate three synchronously and cophasally operating samplers, for example, rotating or electronic switches, which are synchronized by the timing generator 21 and which serve for the brief and impulse-wise reading of the color measuring values *x, y, x* with the frequency *f*. This serves for ascertaining in periodic time intervals T the discrete momentary values of the variables *x, y, z* arriving at the timing points O, T, 2T. Among these discrete momentary values may be all kinds of possible values. Numerals 27, 27′, 27″ indicate three pulse-length modulators (PLM) by means of which the amplitude modulated reading impulses of constant length are converted into time-modulated impulses of constant amplitude, the length (duration) being proportional to the amplitude of the reading impulses. The proportionality factor is thereby such that the highest possible reading impulses amplitude corresponds to a duration $n\tau$ of $n$ counting periods of the length-modulated impulse. Such a pulse-length modulator consists essentially of a capacitor which is quickly charged by the reading impulse to a voltage proportional to the amplitude thereof and which is over a resistor immediately slowly discharged to a constant residual voltage. A pentode for constant discharge current takes care of the linearizing of the occurring sawtooth voltage. The longest discharge time corresponds thereby to the highest impulse amplitude and amounts to $n\tau$. The discharge time for the variable capacitor voltage to drop to the constant residual voltage is proportional to the charging voltage applied, that is, proportional to the impulse amplitude. The variable sawtooth voltage thus obtained is thereupon cut to the residual voltage, by means of a top value limiter, thereby obtaining the time modulated impulses of constant amplitude.

The individual samples which are periodically taken from the steady signal do not detract from the information content. It must be considered in this connection that, in accordance with the scanning theory in the signalling art, a steady signal can be completely replaced, that is, without any information loss, by individual discrete momentary values which are periodically obtained (read) provided that the reading frequency is at least twice as high as the highest possible signal frequency.

The highest picture point frequency in the scanning of color copies or of the photographic color extractions, amounts to about 1000 cycles. If the steady color information signals are in accordance with the scanning proposition read with 2000 cycles, the steady signal will be completely represented by the totality of the discrete momentary values.

The next step resides in the quantisizing of the momentary values of the signals, which may assume all possible values. The time modulated impulses open for their respective duration the gates (T) 28, 28′, 28″ which allow passage of a number of counting impulses from 22, such number being proportional to the duration of the corresponding interval. Since the gates 28, 28′, 28″ can pass only a whole number of impulses, each signal value obtained in the reading is substituted by the whole-number value coming nearest to it. The quantisizing entails a falsification of the momentary signal values which is in the signalling technique known as quantisizing noise or distortion. The greater the quantum number is, the smaller will be the error caused by the substitution of the reading value by a whole-number value which differs by less than one unit from the value ascertained by the reading. The counting impulses passed by the gates 28, 28′, 28″ are counted in the coordinate counters (KZ) 29, 29′, 29″ for the variables *x, y, z*. These counters stop in a reading period T at the counting results which are $\leqq n$ and transmit the counting results to the decoders (DC) or converters 30, 30′, 30″ which indicate the counting results by placing on one and only on one of the terminals $x_1 \ldots x_l$; $y_1 \ldots y_m$; $z_1 \ldots z_n$ voltage or a changed potential which is retained until the counters are placed at normal by an impulse. In each of the output lines of the decoders 30, 30′, 30″ there are gates (T) $\mathbf{31}_1 \ldots \mathbf{31}_l$; $\mathbf{31'}_1 \ldots \mathbf{31'}_m$; $\mathbf{31''}_1 \ldots \mathbf{31''}_n$, which bar the voltages generally from the output terminals, freeing them only during the $(n+1)$th counting step by an impulse outgoing from decoder 24. During the $(n+2)$th counting step, the coordinate counters 29, 29′, 29″ are reset by an impulse from decoder 24. At the $(n+3)$th counting step, which is equal to the first counting step of the new cycle, the coordinate counters begin to count anew. The outputs of the coordinate decoders 30, 30′, 30″ are connected to the coincidence switches 5 (FIGS. 1 and 2) in the individual matrix planes.

The explained reading and quantisizing device is known from pulse modulation. Its use is recommended for the present purpose if a moderate number of quantisizing stages is involved which does not exceed approximately 50. The required pulse frequency amounts in this case to 50, 2000 cycles=100,000 cycles. This impulse number per second can be counted by electronic counters built up by flip-flop stages by the use of low frequency transistors.

FIG. 4 shows in block diagram manner an example for the devices 6, 7, 8 indicated in FIG. 1.

In FIG. 4, $u_1 \ldots u_p$; $v_1 \ldots v_q$; $w_1 \ldots w_r$, indicate the inputs to these devices which are connected with the matrix switches 5 of the matrix 4 (FIGS. 1, 2) according to the desired functions. References $\mathbf{32}_1 \ldots \mathbf{32}_p$ are *p* electronic switches for the *u*-inputs; $\mathbf{32'}_1 \ldots \mathbf{32'}_q$ are *q* electronic switches for the *v*-inputs; and $\mathbf{32''}_1 \ldots \mathbf{32''}_r$ are $\tau$ electronic switches for the *w*-inputs. The outlets of the *u*-switches 32, the *v*-switches 32′ and the *w*-switches 32″ are mutually connected in parallel and conducted to the output terminals U, V, W. References $\mathbf{33}_1 \ldots \mathbf{33}_p$ are *p* voltage sources which deliver the discrete voltages $U_1 \ldots U_p$ at the *u*-outlet of the switching arrangement 6 (FIG. 1); $\mathbf{33}_1 \ldots \mathbf{33'}_q$ are *q* voltage sources which deliver the discrete voltages $V_1 \ldots V_q$ at the *v*-output of the switching arrangement 7; and $\mathbf{33''}_1 \ldots \mathbf{33''}_r$ are *r* voltage sources which deliver the discrete voltages $W_1 \ldots W_r$ at the *w*-outlet of the switching arrangement 8. All switches 32 are controlled in dual manner. All switches 32 are opened by the *n*th impulse of decoder 24, so that the discrete voltages U, V, W lying until then on the output terminals *u, v, w*, are disconnected from these terminals.

The $(n+1)$th impulse of decoder 24 is effective to open all gates 31, 31′, 31″ in the output lines of the decoders 30, 30′, 30″, for the duration of such impulse, and these gates release the three coordinate voltages that might at that instant be present, impulsewise for the matrix 4. The And-condition is thereby fulfilled for the activated matrix switch 5. The actuated matrix switch 5 supplies in this case simultaneously an impulse to the three inputs *u, v, w* connected therewith, whereby the respectively associated switches 32, 32′, 32″ are closed, such switches remaining closed, and whereby the associated voltages U, V, W are released for the outputs U, V, W. The involved switches remain closed for almost the duration of the entire next reading period, that is, up to the *n*th impulse of the next reading period when such next impulse effects the opening of these switches. The corresponding switches 32 accordingly remain closed for $(n+1)$ impulse periods. The output voltages U, V, W are not released impulsewise but are retained for almost an entire reading period, so that there is sufficient time in which these output voltages U, V, W can control lamps for the recording of the corrected photographic color extractions, such recording requiring a minimum illumination time for effecting sufficient opacity (blackening) of the corrected color extraction plates.

FIGS. 5*a* to 5*e* show in diagram form the timing plan for the above described operations. The time course for the individual operations is represented for two successive reading periods T. The highest possible quantum number is in this example $n=14$ and the impulse number is $n+2=16=2^4$.

Figures 5A, 5B, 5C, 5D, 5E:
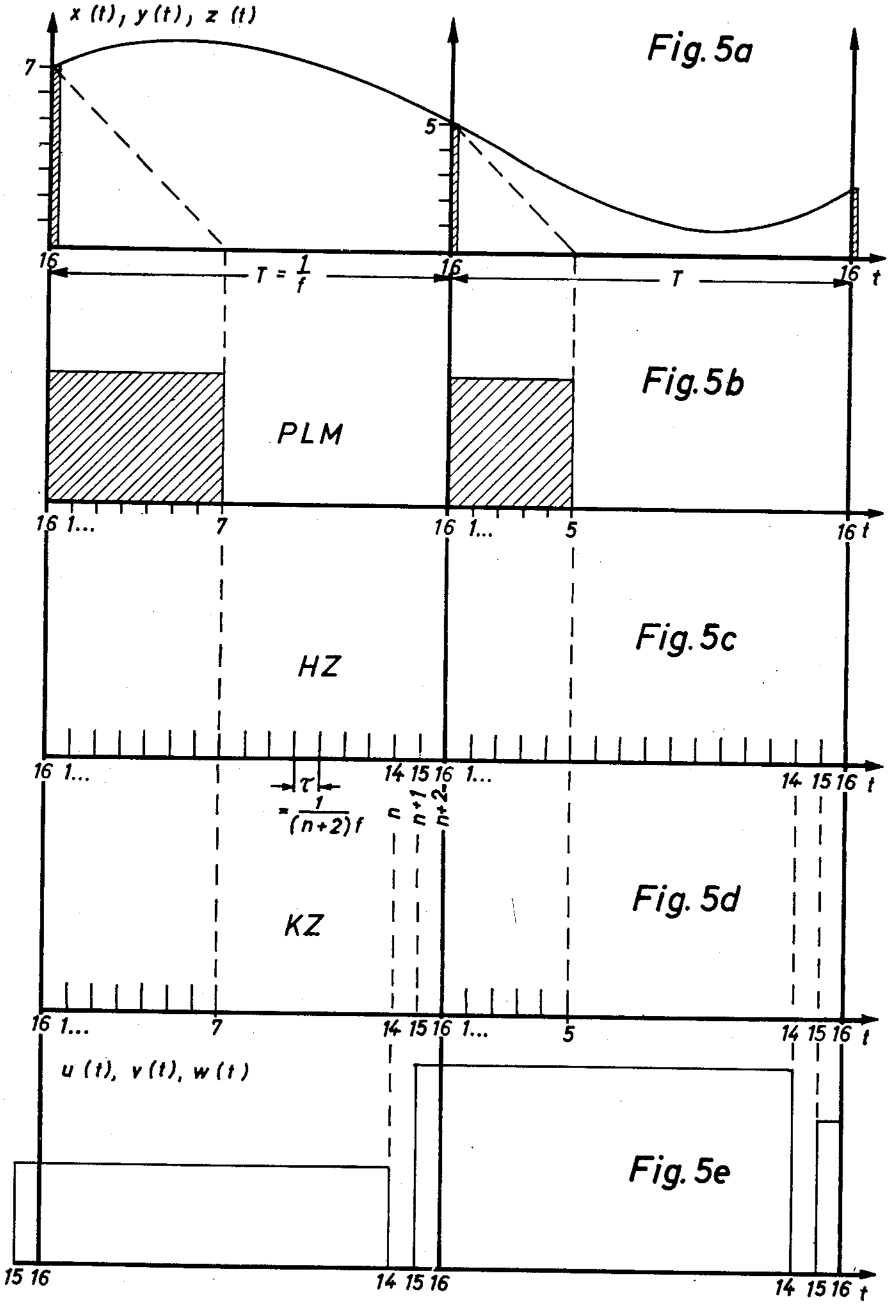

In FIG. 5*a*, the reading value is at the start of the reading period approximately equal to 7 voltage units; at the start of the second reading period it is approximately equal to 5 voltage units. The saw-tooth operation incident to the slow discharge of the capacitor, which had been charged by the momentary reading value, is indicated by the shaded portions. The discharge process up to residual capacitor voltage accordingly requires at the momentary signal value of the first reading period approximately 7 and at the momentary reading value of the second reading period approximately 5 impulse periods $\tau$.

This pulse-length modulation (PLM) is represented in FIG. 5*b*, the height of the cross hatched impulses indicating the capacitor residual voltage and the length indicating the number of impulse periods.

In FIG. 5*c*, the impulses from the impulse generator 22 are indicated by short lines, such impulses being periodically counted by the main counter 23 from 1–16.

FIG. 5*d* indicates respectively by 7 and 5 short vertical lines the impulses passed by the gates 28 for the duration of the length-modulated impulses according to FIG. 5*b*. These impulse numbers are counted by the coordinate counters 29, such counters stopping at the respective counting result and being restored again by the 16th impulse from the decoder 24, so that they begin to count again from 1 with the 17th impulse.

FIG. 5*e* represents the time relationship at the blocking and release of the *u*-, *v*-, *w*-values effected by the matrix switch 5. The 14th impulse effects disconnection of the function value remaining from the preceding reading period. The 15th impulse effects release of the new function value shortly before conclusion of the first reading period and remains connected for 15 impulse periods, that is, for almost the entire next reading period. The 14th impulse of the second reading period effects again disconnection of this function value so as to make room for a new function value incident to the 15th impulse.

In the case of a great number of quantisizing stages, exceeding about 50, difficulties will appear in connection with the impulse counting if low frequency transistors are used as structural elements for the flip-flop binary counter. At 64–128 quantum stages, impulse frequencies on the order respectively of 128 and 256 kilocycles would be reached, requiring for the counting the use of expensive high frequency transistors or tubes. It is in such case advisable not to represent the whole-number signal quanta by impulse numbers corresponding to the quanta numbers, but to code the quanta numbers, for example, by means of a binary code known in the teleprinter technique and also from pulse-code modulation (PCM). The quanta numbers are thereby represented by short sequences of impulses the positions of which are within an impulse sequence period always the same, and which characterize by the presence and absence the whole-number amplitude value. The effect is similar as in a teleprinter except that letters, ciphers and symbols are coded in teleprinter operation. The representation of whole numbers by binary impulse combinations corresponds to the representation of whole numbers in the binary (also in the dual or dyadic) printing if the absence of an impulse is characterized by the cipher 0 and the presence of an impulse by the cipher 1. It is possible to express with all possible combinations of $k$ impulses and impulse gaps exactly $2^k$ different successive numbers, for example, with 5 impulses $2^5=32$, with 7 impulses $2^7=128$ numbers.

Figure 6:
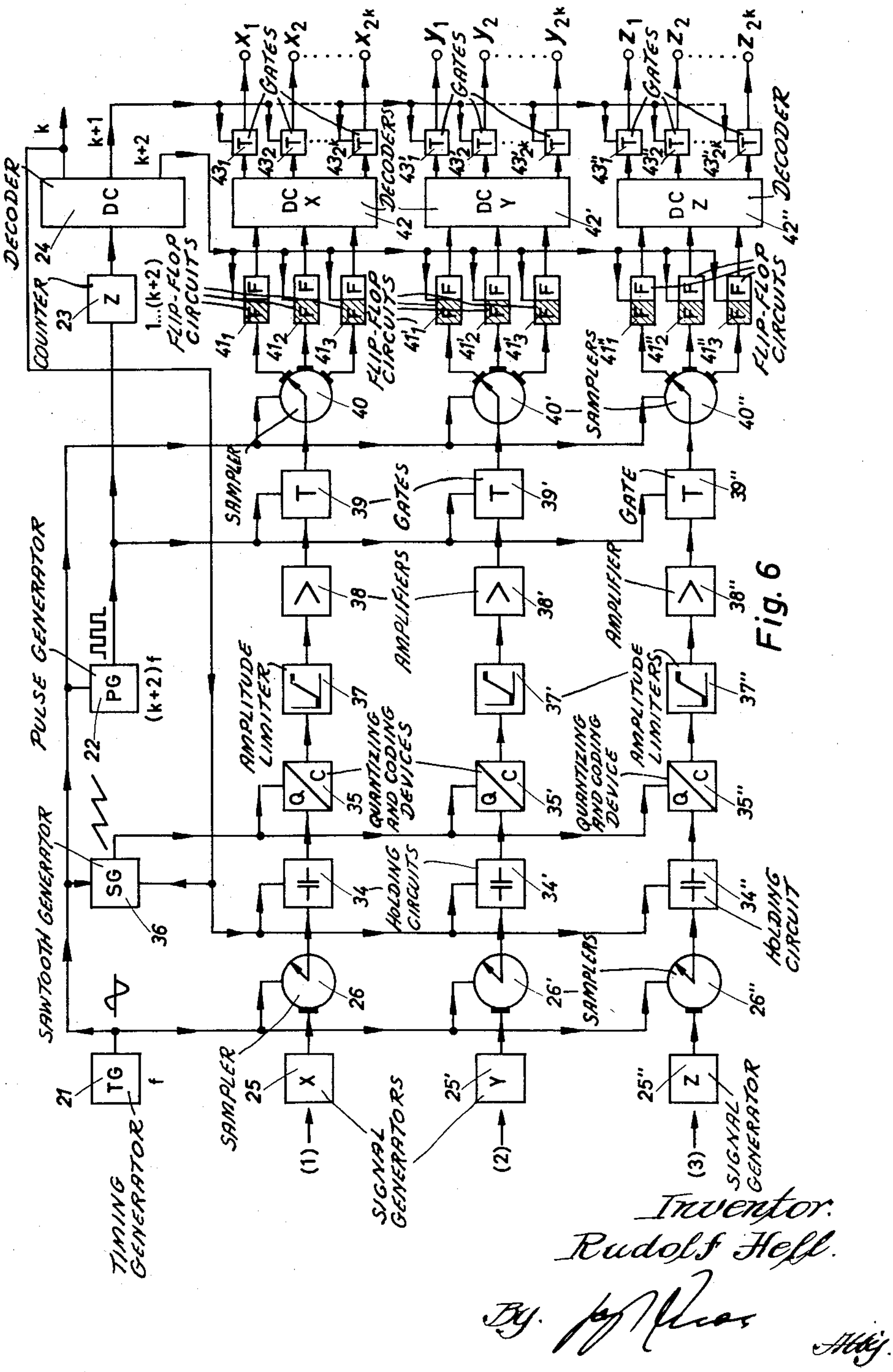

FIG. 6 shows an example for the devices 1, 2, 3 of FIG. 1, employing coding subsequent to the quantisizing. Numeral 21 again indicates a timing generator for the frequency $f$ and 22 is an impulse generator producing the frequency $(k+2)f$, said generators being mutually synchronized. It shall be assumed that the highest possible quantum number is $2^k$, wherein $k$ is the basis for the binary code. All possible impulse combinations are required for representing the different quanta stages $2^k$. The counter 23 therefore needs to count at the most $k$ impulses instead of $2^k$ impulses. However, similar as in the circuit according to FIG. 3, two further impulses are in each reading period required for switching purposes, so that the frequency of the impulse generator must amount to $(k+2)f$ and that the counter 23 must count from 1 to $k+2$. It is in the case of the example further assumed that there are provided $k=3$, that is, $2^k=2^3=8$ quanta stages. Accordingly, $k+2=5$ and the necessary impulse frequency amounts only to five times the reading frequency $f$, as compared with the example according to FIG. 3, requiring for eight quanta stages a tenfold impulse frequency. The decoder 24 again has three outputs and indicates only the $k$th, $(k+1)$th and $(k+2)$th counting steps. Numerals 25, 25', 25'' again indicate the three signal generators for delivering the steady color informations $x$, $y$, $z$ which are to be corrected.

Numerals 26, 26', 26'' are again three synchronously and cophasally operating samplers, for example, rotating or electronic switches, which are synchronized by the timing generator 21 and briefly read the color measurement signal values $x$, $y$, $z$ impulsewise and periodically with the frequency $f$. Numerals 34, 34', 34'' are three holding circuits in the form of three capacitors, which store the read momentary values for almost the entire sampling period. The capacitors 34 are discharged again by the $k$th impulse of the decoder 24. Numerals 35, 35', 35'' indicate three quantisizing and coding devices, for example, in the form of coding tubes, the nature of which will presently be explained. Numeral 36 indicates a sawtooth generator which delivers the periodic horizontal deflection voltages for the coding tubes 35. The sawtooth generator 36 is synchronized by the timing generator 21 and is restored by the $k$th impulse of the decoder 24. Since the shape of the impulses from the coding tubes 35 is unsuitable for further use, it must first be changed to a standard impulse shape. It must be considered in this connection that, if there is a gap between two impulses of an impulse combination, the impulse will drop to zero, but if two impulses follow without gap, the individual impulses will not completely drop to zero. The amplitude filters (high- and low value limiter) 37, 37', 37'' are therefore provided for cutting from the impulses flat portions in the neighborhood of the zero line. The consequence is that these portions are interrupted if there is a gap between two impulses, while these portions are continuous if two or more impulses follow in succession without gaps. The impulse portions are amplified in the amplifiers 38, 38', 38''. The amplified impulse portions control the gates 39, 39', 39'' which pass from the impulse generator 22 a number of impulses proportional to the duration of the impulse portions, the passed impulses being accurately defined as to shape and position thereof. The conversion of the impulses coming from the coding tubes into the impulse portion referred to constitute a combined pulse-length and pulse-position modulation. Numerals 40, 40', 40'' indicate three synchronously and cophasally operating, rotating or electronic multiple switches—in the example, due to the ternary code, ternary switches—, which are synchronized by the timing generator 21. The individual successive impulses of the impulse sequences passed by the gates 39 during a reading period are spatially distributed to $k$ lines. In the example, due to the ternary code, there are three such lines having disposed therein the flip-flop circuits $41_1$, $41_2$, $41_3$; $41'_1$, $41'_2$, $41'_3$; $41''_1$, $41''_2$, $41''_3$. These circuits, responsive to each impulse conducted thereto, flip from one to the other of their two possible conditions. Due to the alternating condition constellation of the flip-flop groups 41, 41', 41'', the impulse combinations will be unambiguously defined at the end of each reading period. The decoders or converters 42, 42', 42'' for the signals *x*, *y*, *z* effect the decoding and signalling of the impulse combinations connected thereto. This is accomplished then and only then when voltage or a changed potential appears at one and only one of the output terminals $x_1, x_2 \ldots x_2h; y_1, y_2 \ldots y_2k; z_1, z_2 \ldots z_2k$ allotted to the individual impulse combinations, when the associated impulse combination is present. At the end of each reading period, the flip-flop circuits 41 are restored to zero condition by the $(k+2)$th impulse—in the example, the 5th impulse— of the decoder 24, such condition being defined by one of the two possible conditions. In the output lines of the decoders 42, 42', 42'' are moreover disposed the gates $43_1 \ldots 43_2k$; $43'_1 \ldots 43'_2k$; $43''_1 \ldots 43''_2k$. These gates release the indicating voltages only during the $(k+1)$th impulse from the decoder 24 to the output terminals and to the matrix switch 5 (FIG. 1). The example illustrated in FIG. 6 is known from pulse-code modulation (PCM). The devices 6, 7, 8 (FIG. 1) are upon utilizing the embodiment just described for the devices 1, 2, 3 (FIG. 1) the same as those represented in FIG. 4.

FIGS. 7*a* to 7*h* show in diagram form the timing plan for the quantisizing and coding operations described above with reference to FIG. 6. The time course of the individual operations is again represented for two successive reading periods T. The highest possible quantum number is in the assumed example $2^k=2^3=8$ and the impulse number is $k+2=5$.

Figures 7A, 7B, 7C, 7D, 7E, 7F, 7G, 7H:
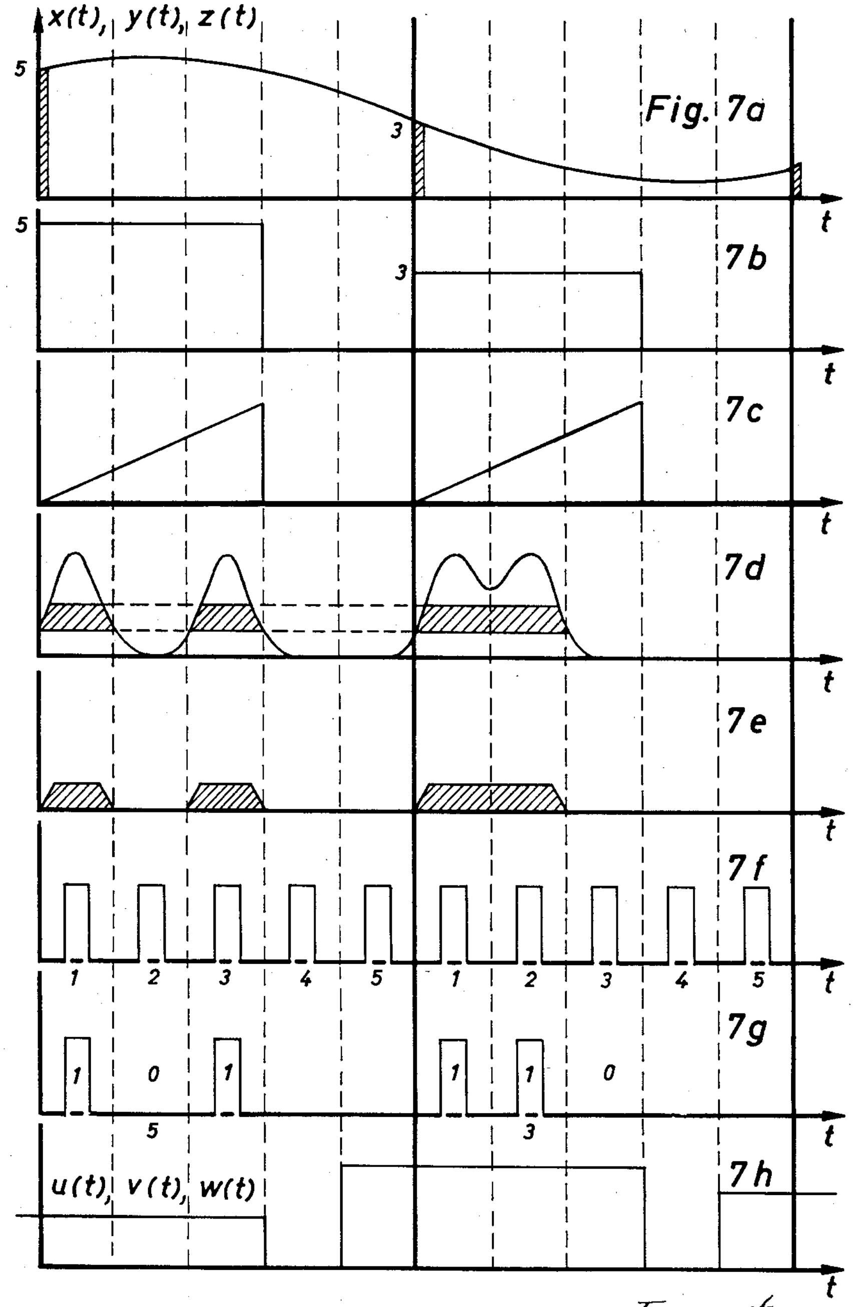

In FIG. 7*a*, the momentary reading value at the beginning of the first reading period is approximately equal to 5 voltage units and at the beginning of the second reading period, it is approximately equal to 3 voltage units. FIG. 7*b* shows the two corresponding capacitor voltages of the holding circuit, such voltages being stored each for the duration of three impulse periods. FIG. 7*c* shows the shape of the impulses of the impulse sequences horizontal deflection of the cathode beam of the coding tube. The sawtooth voltage drops in each reading period at the end of the third impulse period to zero. FIG. 7*d* shows the shape of the impulses of the impulse sequences delivered from the punched plate of the coding tube.

In accordance with the quantum numbers 5 and 3, assumed in the involved example, the number 5 is according to the binary code represented by the combination 1—0—1 and the number 3 is represented by the combination 1—1—0, the symbol number 1 indicating the presence and the symbol number 0 indicating the absence of an impulse. In FIG. 7*d*, with the impulse shape delivered by the coding tube, the voltage drops to zero in the gap betwen the first and third impulse of the first reading period, while dropping only by about half of the impulse amplitude between the two successive impulses which follow without gap in the second reading period. FIG. 7*e* shows the flat impulse portions cut by the amplitude filter 37 in the neighborhood of the zero line, such portions being interrupted when a gap is present between two impulses, and being continuous when two successive impulses are without gap. The positions and lengths of these flat impulse portions unambiguously define the corresponding impulse combination.

FIG. 7*f* shows the rectangular impulses delivered by the impulse generator 22. FIG. 7*g* shows the impulse combinations passed by the gates 39 which are opened by the length- and position-modulated impulses according to FIG. 7*e*. The impulses of these combinations are accurately defined as to shape and position. FIG. 7*h* shows the timing relationship incident to the blocking and release of the *u*, *v*, *w* values released by the matrix switch 5 (FIG. 1). The third impulse disconnects the function value remaining from the preceding reading period. The fourth impulse releases the new function value shortly before conclusion of the first reading period, such impulse remaining connected for the duration of four impulse periods, that is, for almost the entire successive reading period. The third impulse of the second reading period disconnects this function value again, so as to make room for a new function value at the fourth impulse.

Figure 8:
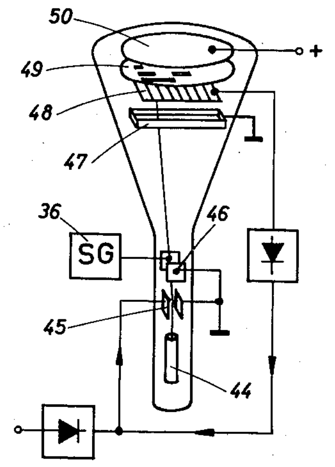
FIG. 8 shows a quantisizing and coding tube.

FIG. 8 shows a known coding tube for simultaneously effecting the quantisizing and coding. The tube consists essentially of a cathode 44, a pair of plates 45 for the vertical, a pair of plates 46 for the horizontal deflection of the cathode beam, a trap grid 47, a quantisizing grid 48, a punched plate 49 for the coding, and an anode or target plate 50. The binary combinations are represented on the plate 49 by punched holes and intermediate spaces. The signal voltages obtained by the reading, which are being held by the holding circuits 34, are connected to the plates 45, thereby upwardly deflecting the cathode beam to the left of the perforated part of the puunched plate 49, that is, by a distance which is proportional to the voltage connected to the deflection plates. The beam is thereupon, by the quantisizing grid 48, accurately guided into the row of punched holes which is nearest to the deflected position of the cathode beam. The cathode beam, which is now accurately at the height of a wire of the quantisizing grid 48, is after the quantisizing deflected horizontally by a voltage from the sawtooth generator 36 which is placed on the plates 46. The beam is thereupon made ineffective by darkening control and flips into its initial position to the left of the punched rows. The capacitor of the holding circuit 34 is at the same time discharged tipping the beam vertically downwardly into its zero position. During the horizontal deflection across the row of punched holes, electrons will pass through the holes, such electrons being caught by the plate 50 and thus delivering a binary impulse combination. Since all possible values may appear in the signal voltages obtained in the reading, and since the cathode beam has a finite cross section, it may happen that the beam impinges at a point between two rows of punched holes, thereby simultaneously scanning both rows, which would not effect release of a definite impulse combination. Secondary electrons occurring when the electron beam hits a wire of the quantisizing grid 48 are drained off by the trapping grid 47. The grid current is higher when the beam center impacts the wire directly than when it lies betwen two neighboring wires. The grid currents from 48 are fed back to the deflection amplifier for the vertical beam deflection with the result that the electron beam is held by the grid wires and that only the deflection paths along these grid wires are stable. All signal voltages obtained in the reading, which differ by less than one unit from a quantum stage, are in this manner carried to this quantum stage and effect an impulse combination which is allotted to such quantum stage.

Figure 9:
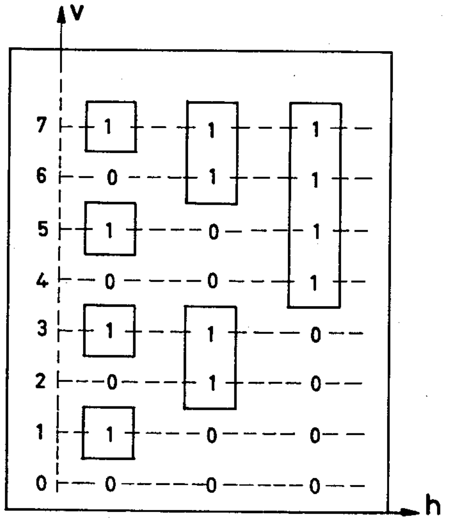
FIG. 9 illustrates a punched code plate for the tube shown in FIG. 8.

FIG. 9 represents the punched plate 49 of the coding tube according to FIG. 8. In the example shown, it is assumed that the signal values are quantisized in eight stages and correspondingly used as a ternary-binary code. The first punched row has four holes, the second has two holes and the third has one hole, the holes of each succeeding row being twice as high than those of the preceding row. The vertical deflection path of the cathode beam left of the first hole row is indicated by the vertically extending dash line, and the stable horizontal quantisized deflection paths of the cathode beam as well as the wires of the quantisizing grid 48 are indicated by horizontal dash lines. The eight possible impulse combinations of the binary code are obtained in the scanning of the individual hole rows by the cathode beam, by the particular arrangement of the hole shutters. For higher quantum numbers, the punched plate will have correspondingly more hole columns and hole rows. Exactly *k* hole columns and $2^k$ hole rows will be required for the binary representation of $2^k$ quantum stages.

Figure 10:
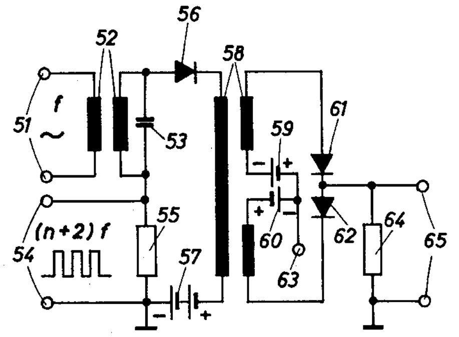
FIG. 10 represents an electronic sampler.

FIG. 10 shows a known example for the electronic reading switches 26 indicated in FIGS. 3 and 6. The reading frequency $f$ of the timing generator 21 is connected to the terminals 51 of the transformer 52, the secondary side being in a resonance circuit comprising the capacitor 53. The impulse frequency $(n+2)f$ supplied by the impulse generator 22 is connected to the terminals 54 and to the resistor 55 which is disposed in series with the resonance circuit comprising the secondary winding of transformer 52 and the capacitor 53. The negative half waves of the timing frequency, on which is superimposed the impulse frequency, are suppressed by the diode 56 which is biased by the battery 57 at a voltage which is equal to the amplitude of the timing frequency $f$. The timing frequency $f$ extracts from the counting impulses of the frequency $(n+2)f$ each $(n+2)$th impulse which coincides with a maximum of $f$, such impulse being separated by way of the biased diode 56. The separated impulse opens by way of the transformer 58 two further diodes 61 and 62 which are biased by means of batteries 59 and 60, and releases for the duration of the impulse the signal to be read which is connected at 63. The scanned momentary signal value appears at the resistor connected to terminals 65.

Figure 11:
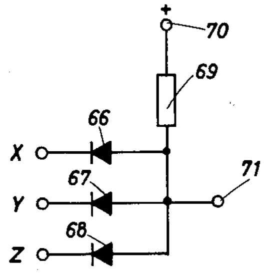
FIG. 11 shows a coincidence switch for the matrix.

FIG. 11 shows a known example of a matrix switch 5 for use in the arrangement according to FIG. 1. As has been explained before, the matrix switches constitute coincidence switches which energize only when the And-condition is fulfilled. Characters $x$, $y$, $z$ indicate coordinate outputs of the devices 1, 2, 3 indicated in FIG. 1. These outputs extend respectively over coordinate lines by way of diodes 66, 67, 68 to the resistor 69 one end 70 of which is connected to positive potential. If one or two or all three coordinate outputs $x$, $y$, $z$ carry a potential lower than the potential at 70, current will flow from 70 by way of 69 and one or two or all three diodes 66, 67, 68 to the terminals $x$, $y$, $z$. The resistance of the resistor 69 is very high as compared with the pass resistance of the diodes and the other end of the resistor, at the point 71 will therefore assume a potential which corresponds practically to that on the terminals $x$, $y$, $z$. The point 71—the output of the coincidence switch—will assume the potential corresponding to that on point 70, then and only then, when all three terminals $x$, $y$, $z$ are due to three impulses or voltages conducted thereto at a potential corresponding to that which is at point 70.

Figure 12:
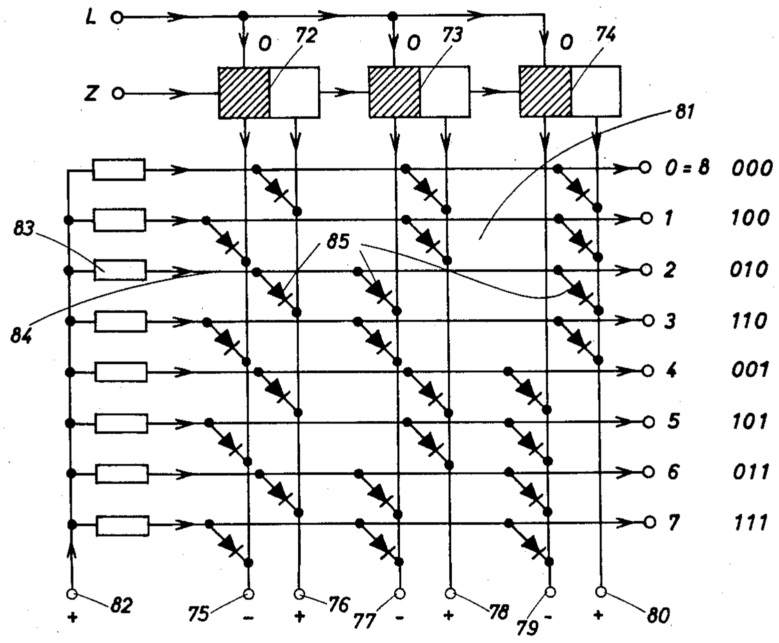
FIG. 12 illustrates a binary counter and a diode matrix for the decoder.

FIG. 12 illustrates a known embodiment for the binary counters 23, 29 and the decoders 24, 30, 42. A binary counter comprises a plurality of serially connected flip-flop circuits 72, 73, 74 made in the form of bistable multi vibrator circuits. A bistable flip stage consists in general of two tubes or two transistors connected in Jordan-Eccles circuit. The number of required flip-flop circuits is equal to the fundamental $k$ of the binary code—flip-flop stages in case of the example shown—thus allowing the counting of $2^k$ impulses. A flip-flop circuit can assume two different conditions, namely, the first tube may be conductive with the second tube being blocked, such condition being referred to the symbol 0; or the first tube is blocked and the second tube is conductive, this latter condition being referred to the symbol 1. In the first case, the plate potential of the first tube will drop and that of the second tube will increase; in the second case, the plate potential of the first tube will increase and that of the second tube will drop. Each positive impulse conducted to the input of the first tube causes the circuit to flip from one to the other condition and to remain in such condition until arrival of the next impulse which causes reversal of the condition. In the series connection of the flip-flop circuits, the output from 72 controls the input of 73 the output of which controls the input of 74. Whenever the second tube of the respective flip-flop circuits 72, 73 or 74 passes from the conductive to the blocked condition, the input of the respectively next successive flip-flop circuit will receive a positive impulse which causes flipping thereof to another condition. However, when the second tube of the respective flip-flop circuits 72, 73 or 74 goes from the blocked to the conducting condition, the input of the respectively next successive flip-flop circuit will receive a negative impulse which will not cause change of its condition. If the condition constellation of the three flip-flop circuits 72, 73, 74 is at the start 000, as indicated in FIG. 12, and if 8 impulses are successively conducted to the input Z, the counter will successively assume the condition constellations 100, 010, 110, 001, 101, 011, 111, 000. These are, however, the dual (side reversed) expressions corresponding to the octal numbers 1–8. The eighth impulse restores the counter to the condition 000 which may be recognized octally with 0 or 8. A cancellation impulse may be conducted to all flip-flop circuits, which are connected in parallel to the cancellation line L, so as to restore the counter to the condition 000 at any time desired.

The plates of the respective flip-flop circuits are connected to pairs of terminals 75—76; 77—78; 79—80. The prevailing counting result may be read from the potential constellations of these terminal pairs. The diode matrix 81 serves respectively for the indication or signalling of the counting result and the decoding of the binary potential constellations, such diode matrix 81 representing in the assumed example a dual-octal converter. The output terminals of this converter are indicated by numerals 0—7.

The operation of the diode matrix is similar to that of the diode switch according to FIG. 11. From the terminal 82, which carries the same potential as the terminals 76, 78, 80, there extend by way of eight parallel connected resistors 83 eight lines 84 to the output terminals 0—7. Each of these lines is by way of three diodes 85 connected with one of the two terminals of the terminal pairs 75, 76; 77, 78; 79, 80, in any possible combination of which there are exactly eight. Each of these connection combinations corresponds only to one and only one of the eight possible different condition constellations of the flip-flop circuits 72, 73, 74, which are noted in dual terms of writing at the right of the output terminals 0—7. Assuming a predetermined condition constellation of the flip-flop circuits, which corresponds to a prevailing counting result, the respectively associated output terminal—in the assumed example the terminal 0=8— and only this terminal will have the potential 82 while all other output terminals will carry the lower potential of the terminals 75, 77, 79.

The decoders described in connection with FIG. 6 correspond structurally to the above described decoder according to FIG. 12 with the only difference as compared with FIG. 12, that the three flip-flop circuits 72, 73, 74 are not connected serially, that is, that they do not count, but that their inputs are individually and mutually independently connected to the contacts of the multiple swiches 40 shown in FIG. 6.

Magnetic storage ring cores may be used equally well in place of the diodes for the switching elements of the two-dimensional converter and decoring matrix 81 shown in FIG. 12 and also in place of the coincidence switches 5 of the three dimensional matrix 4 of FIG. 1.

Changes and modifications may be made within the scope and spirit of the appended claims.

I claim:

1. In the art of reproducing color copies, wherein a color copy or three color extractions photographically obtained therefrom are scanned pointwise in consecutive lines, a method of color correction, comprising substituting a sufficiently great number of different discrete values for each of the three variable color measurement values $x$, $y$, $z$ of the color picture points of the copy to be reproduced, said color measurement values $x$, $y$, $z$ constituting a trio of values respectively characterizing a pigment color as to shade and color saturation, likewise substituting a sufficiently great number of discrete values for each of the three steadily variable color dosings $u$, $v$, $w$ for the color picture points of the reproduction, said color dosings $u$, $v$, $w$ constituting a trio of the respective relative screen point values or of the respective relative depths of cups of the color separation prints, said color dosings functionally relating to the color measurement values $x$, $y$, $z$ by three functions $u=b(x, y, z)$, $v=r(x, y, z)$, $w=g(x, y, z)$, wherein the functions $b$, $r$ and $g$ correspond to predetermined reproduction factors, storing the trios of discrete color dosings, and releasing them by offering to them the associated trios of discrete color measurement values.

2. A method according to claim 1, comprising subjecting the discrete color measurement values $x$, $y$, $z$ prior to correction to logarithmic compression and subjecting the discrete color dosing values $u$, $v$, $w$ after the correction to anti-logarithmic expansion.

3. A method according to claim 1, comprising selectively altering the three color correction functions to satisfy different correction requirements.

4. In the art of reproducing color copies, wherein a color copy or three color extractions photographically obtained therefrom are scanned pointwise in consecutive lines, apparatus for effecting color correction by substituting a sufficiently great number of different discrete values for each of the three variable color measurement values $x$, $y$, $z$ of the color picture points of the copy to be reproduced, said color measurement values $x$, $y$, $z$ constituting a trio of values respectively characterizing a pigment color as to shade and color saturation, likewise substituting a sufficiently great number of discrete values for each of the three steadily variable color dosings $u$, $v$, $w$ for the color picture points of the reproduction, said color dosings $u$, $v$, $w$ constituting a trio of the respective relative depths of cups of three color separation prints, said color dosings functionally relating to the color measurement values $x$, $y$, $z$ by three functions $u=b(x, y, z)$, $v=r(x, y, z)$, $w=g(x, y, z)$, wherein the functions $b$, $r$ and $g$ correspond to predetermined reproduction factors, and by storing the trios of discrete color dosings, and releasing them by offering to them the associated trios of discrete color measurement values; said apparatus comprising means forming for each color measurement value $x$, $y$, $z$ an electronic channel, means for conducting to the input of each channel, at a speed corresponding to the speed of scanning, the corresponding color measurement value which is variable as to time and which is represented by proportional electric signals, each channel comprising a switch for brief periodic reading of the signals, a quantisizing device for converting the discrete signal values ascertained in the reading into a finite number of signal quanta, and a converter for indicating the individual quantum numbers, said converter having a number of outputs corresponding to the number of quantisizing stages, a voltage alteration appearing in each reading period only at the output to which is allotted the signal quantum which is present in the reading.

5. Apparatus according to claim 4, comprising in each electronic channel means for the color measurement values $x$, $y$, $z$ which effect coding of the signal quanta.

6. Apparatus according to claim 4, comprising a three-dimensional matrix provided with coincidence switches having respectively three inputs and one output, each coincidence switch being on the input side connected with one of the outputs of the $x$-, the $y$- and the $z$-channel, each coincidence switch extending at the output side the output voltages from the three channels connected thereto in a reading period then and only then when said three output voltages are simultaneously present.

7. Apparatus according to claim 6, comprising for each discrete color dosing value $u$, $v$, $w$ a switch and a voltage source, the voltage of said source being proportional to the corresponding color dosing value, each coincidence switch of said matrix being on the output side in accordance with functional allocation connected with the three inputs of a switching group comprising switches for the values $u$, $v$, $w$, a common output line all said switches being on the output side respectively mutually interconnected and connected with said common output line, and control means for causing those of three of said switches which form a group and which are closed in a reading period by an impulse from a coincidence switch to release to the common output lines the three corresponding color dosing voltages $u$, $v$, $w$ for such a time until all involved switches are opened by a control impulse from said control means.

8. Apparatus according to claim 7, comprising a timing generator and an impulse generator for respectively effecting the timing and synchronization and control of individual switching operations, said impulse generator supplying impulses at a frequency which is as many times higher than the timing frequency supplied by said timing generator as the highest possible quanta stage number of the fundamental number of the code employed, increased by the number of control impulses required in each reading period for switching purposes, a counter for periodically counting the impulses delivered during a reading period by the impulse generator, and a converter for supplying at the output side respectively in the form of single impulses individual partial counting results required for the control of switching operations.

9. Apparatus according to claim 6, comprising three identical contact strips to the contacts of which are connected the outputs of all coincidence switches of the matrix, three further contact strips to the contacts of which are respectively connected the inputs of the respecive $u$- and $v$- and $w$-switches, and a supply of additional contact strips containing wiring respectively representative of different allocations of color dosing values $u$, $v$, $w$ to the color measurement values $x$, $y$, $z$, said additional contact strips serving for interconnecting the contacts of the three contact strips for the outputs of the coincidence switches with the contacts of the respectively associated further contact strips.

10. Apparatus according to claim 5, comprising a cathode ray tube for simultaneously effecting the quantisizing and the coding, said tube comprising a trapping grid, a quantisizing grid and a punched coding plate.

11. Apparatus according to claim 5, comprising a two-dimensional diode matrix constituting the converter for the indication of individual quantum numbers and for the decoding of the coded signal quanta.

12. Apparatus according to claim 6, wherein each coincidence switch of the matrix comprises three diodes.

13. Apparatus according to claim 4, comprising means for representing the signal quanta by impulse numbers corresponding to the quantum numbers thereof.

References Cited in the file of this patent

UNITED STATES PATENTS 2,664,462 Bedford et al. ---------- Dec. 29, 1953